(12) United States Patent
Roberts et al.

(10) Patent No.: US 10,423,045 B2
(45) Date of Patent: Sep. 24, 2019

(54) ELECTRO-OPTICAL DIFFRACTIVE WAVEPLATE BEAM SHAPING SYSTEM

(71) Applicant: Beam Engineering for Advanced Measurements Co., Orlando, FL (US)

(72) Inventors: David E. Roberts, Apopka, FL (US); Nelson V. Tabirian, Winter Park, FL (US)

(73) Assignee: Beam Engineering for Advanced Measurements Co., Orlando, FL (US)

( * ) Notice: Subject to any disclaimer, the term of this patent is extended or adjusted under 35 U.S.C. 154(b) by 220 days.

(21) Appl. No.: 15/350,856

(22) Filed: Nov. 14, 2016

(65) Prior Publication Data

US 2018/0136535 A1    May 17, 2018

(51) Int. Cl.
| G02F 1/13 | (2006.01) |
| G02F 1/29 | (2006.01) |
| G02B 27/09 | (2006.01) |
| G02B 27/00 | (2006.01) |

(52) U.S. Cl.
CPC ........... *G02F 1/29* (2013.01); *G02B 27/0012* (2013.01); *G02B 27/0916* (2013.01); *G02B 27/0944* (2013.01); *G02F 2201/305* (2013.01); *G02F 2203/01* (2013.01); *G02F 2203/22* (2013.01)

(58) Field of Classification Search
None
See application file for complete search history.

(56) References Cited

U.S. PATENT DOCUMENTS

| 2,435,616 | A | 2/1948 | Vittum |
| 3,721,486 | A | 3/1973 | Bramley |
| 3,897,136 | A | 7/1975 | Bryngdahl |
| 4,160,598 | A | 7/1979 | Firester et al. |

(Continued)

FOREIGN PATENT DOCUMENTS

| EP | 1970734 | 9/2008 |
| EP | 2088456 | 12/2009 |

(Continued)

OTHER PUBLICATIONS

Vernon, J., et al., Recording Polarization Gratings with a Standing Spiral Wave, Applied Physics Letters, Oct. 2013, vol. 103, 4 pages.

(Continued)

*Primary Examiner* — Richard H Kim
(74) *Attorney, Agent, or Firm* — Brian S. Steinberger; Hilary F. Steinberger; Law Offices of Brian S. Steinberger, P.A.

(57) ABSTRACT

Optical beam shaping systems and methods can include an illumination source and a diffractive waveplate diffuser. The diffractive waveplate diffuser includes a layer of patterned optically anisotropic material. In one embodiment, the layer of patterned optically anisotropic material is fabricated in the form of patterned, optically anisotropic liquid crystal polymer. In another embodiment, the layer of patterned optically anisotropic material is a layer of liquid crystal, the diffractive waveplate diffuser also includes two alignment layers and two transparent conductive coatings, and the properties of the liquid crystal layer are controlled by the application of an electric potential between the two transparent conductive coatings. A method is provided for designing the alignment pattern of the layer of optically anisotropic material.

7 Claims, 7 Drawing Sheets

(56) References Cited

U.S. PATENT DOCUMENTS

| | | | |
|---|---|---|---|
| 4,301,023 A | 11/1981 | Schuberth | |
| 4,698,816 A | 10/1987 | Chun | |
| 4,956,141 A | 9/1990 | Allen | |
| 4,983,332 A | 1/1991 | Hahn | |
| 5,032,009 A | 7/1991 | Gibbons | |
| 5,042,950 A | 8/1991 | Salmon, Jr. | |
| 5,047,847 A | 9/1991 | Toda | |
| 5,100,231 A | 3/1992 | Sasnett et al. | |
| 5,142,411 A | 8/1992 | Fiala | |
| 5,150,234 A | 9/1992 | Takahashi | |
| 5,218,610 A | 6/1993 | Dixon | |
| 5,321,539 A | 6/1994 | Hirabayashi | |
| 5,325,218 A | 6/1994 | Willett | |
| 5,446,596 A | 8/1995 | Mostrorocco | |
| 5,621,525 A | 4/1997 | Vogeler et al. | |
| 5,712,721 A | 1/1998 | Large | |
| 5,895,422 A | 4/1999 | Hauber | |
| 5,903,330 A | 5/1999 | Funschilling | |
| 5,989,758 A | 11/1999 | Komatsu | |
| 6,091,471 A | 7/2000 | Kim et al. | |
| 6,107,617 A | 8/2000 | Love et al. | |
| 6,139,147 A | 10/2000 | Zhang | |
| 6,170,952 B1 | 1/2001 | La Haye et al. | |
| 6,191,880 B1 | 2/2001 | Schuster | |
| 6,219,185 B1 | 4/2001 | Hyde | |
| 6,320,663 B1 | 11/2001 | Ershov | |
| 6,373,549 B1 | 4/2002 | Tombling et al. | |
| 6,452,145 B1 | 9/2002 | Graves et al. | |
| 6,551,531 B1 | 4/2003 | Ford | |
| 6,678,042 B2 | 1/2004 | Tabirian et al. | |
| 6,728,049 B1 | 4/2004 | Tabirian et al. | |
| 6,792,028 B2 | 9/2004 | Cook | |
| 6,911,637 B1 | 6/2005 | Vorontsov et al. | |
| 7,048,619 B2 | 5/2006 | Park | |
| 7,094,304 B2 | 8/2006 | Nystrom | |
| 7,095,772 B1 | 8/2006 | Delfyett et al. | |
| 7,196,758 B2 | 3/2007 | Crawford | |
| 7,319,566 B2 | 1/2008 | Prince | |
| 7,324,286 B1 | 1/2008 | Glebov | |
| 7,450,213 B2 | 11/2008 | Kim et al. | |
| 7,482,188 B2 | 1/2009 | Moon | |
| 7,764,426 B2 | 7/2010 | Lipson | |
| 8,045,130 B2 | 10/2011 | Son | |
| 8,077,388 B2 | 12/2011 | Gerton | |
| 8,264,623 B2 | 9/2012 | Marrucci | |
| 8,520,170 B2 | 8/2013 | Escuti | |
| 8,582,094 B1 | 11/2013 | Shortt | |
| 8,643,822 B2 | 2/2014 | Tan et al. | |
| 8,937,701 B2 | 1/2015 | Rossini | |
| 8,982,313 B2 | 3/2015 | Escuti et al. | |
| 9,541,772 B2 | 1/2017 | De Sio et al. | |
| 9,557,456 B2 | 1/2017 | Tabirian et al. | |
| 9,592,116 B2 | 3/2017 | De Sio et al. | |
| 9,617,205 B2 | 4/2017 | Tabirian et al. | |
| 9,658,512 B2 | 5/2017 | Tabirian et al. | |
| 9,715,048 B2 | 7/2017 | Tabirian et al. | |
| 9,753,193 B2 | 9/2017 | Tabirian et al. | |
| 9,976,911 B1 | 5/2018 | Tabirian et al. | |
| 9,983,479 B2 | 5/2018 | Tabirian et al. | |
| 10,031,424 B2 | 7/2018 | Tabirian et al. | |
| 10,036,886 B2 | 7/2018 | Tabirian et al. | |
| 10,075,625 B2 | 9/2018 | Tabirian et al. | |
| 10,107,945 B2 | 10/2018 | Tabirian et al. | |
| 10,114,239 B2 | 10/2018 | Tabirian et al. | |
| 10,120,112 B2 | 11/2018 | Tabirian et al. | |
| 10,185,182 B2 | 1/2019 | Tabirian | |
| 10,191,191 B2 | 1/2019 | Tabirian et al. | |
| 10,191,296 B1 | 1/2019 | Tabirian et al. | |
| 10,197,715 B1 | 2/2019 | Tabirian et al. | |
| 2001/0002895 A1 | 6/2001 | Kawano | |
| 2001/0018612 A1 | 8/2001 | Carson et al. | |
| 2001/0030720 A1 | 10/2001 | Ichihashi | |
| 2002/0027624 A1 | 3/2002 | Seiberle | |
| 2002/0097361 A1 | 7/2002 | Ham | |
| 2002/0167639 A1 | 11/2002 | Coates | |
| 2003/0021526 A1 | 1/2003 | Bouevitch | |
| 2003/0072896 A1 | 4/2003 | Kwok | |
| 2003/0137620 A1 | 7/2003 | Wang | |
| 2003/0152712 A1 | 8/2003 | Motomura | |
| 2003/0206288 A1 | 11/2003 | Tabirian et al. | |
| 2003/0214700 A1 | 11/2003 | Sidorin | |
| 2003/0218801 A1 | 11/2003 | Korniski et al. | |
| 2004/0051846 A1 | 3/2004 | Blum et al. | |
| 2004/0081392 A1 | 4/2004 | Li | |
| 2004/0105059 A1 | 6/2004 | Ohyama | |
| 2004/0165126 A1 | 8/2004 | Ooi et al. | |
| 2005/0030457 A1 | 2/2005 | Kuan et al. | |
| 2005/0110942 A1 | 5/2005 | Ide | |
| 2005/0219696 A1 | 10/2005 | Albert et al. | |
| 2005/0271325 A1 | 12/2005 | Anderson et al. | |
| 2005/0276537 A1 | 12/2005 | Frisken | |
| 2005/0280717 A1 | 12/2005 | Chen | |
| 2006/0008649 A1 | 1/2006 | Shinichiro | |
| 2006/0055883 A1 | 3/2006 | Morris et al. | |
| 2006/0109532 A1 | 5/2006 | Savas | |
| 2006/0221449 A1 | 10/2006 | Glebov et al. | |
| 2006/0222783 A1 | 10/2006 | Hayashi | |
| 2007/0032866 A1 | 2/2007 | Portney | |
| 2007/0040469 A1 | 2/2007 | Yacoubian | |
| 2007/0115551 A1 | 5/2007 | Spilman | |
| 2007/0122573 A1 | 5/2007 | Yasuike | |
| 2007/0132930 A1 | 6/2007 | Ryu et al. | |
| 2007/0247586 A1 | 10/2007 | Tabirian | |
| 2007/0258677 A1 | 11/2007 | Chigrinov | |
| 2008/0226844 A1 | 9/2008 | Shemo | |
| 2008/0278675 A1 | 11/2008 | Escuti | |
| 2009/0002588 A1 | 1/2009 | Lee et al. | |
| 2009/0052838 A1 | 2/2009 | McDowall | |
| 2009/0073331 A1 | 3/2009 | Shi | |
| 2009/0122402 A1 | 5/2009 | Shemo | |
| 2009/0141216 A1 | 6/2009 | Marrucci | |
| 2009/0201572 A1 | 8/2009 | Yonak | |
| 2009/0256977 A1 | 10/2009 | Haddock | |
| 2009/0257106 A1 | 10/2009 | Tan | |
| 2009/0264707 A1 | 10/2009 | Hendricks | |
| 2010/0003605 A1 | 1/2010 | Gil | |
| 2010/0066929 A1 | 3/2010 | Shemo | |
| 2010/0245954 A1 | 9/2010 | Ahling | |
| 2011/0069377 A1 | 3/2011 | Wu et al. | |
| 2011/0075073 A1 | 3/2011 | Oiwa | |
| 2011/0085117 A1 | 4/2011 | Moon et al. | |
| 2011/0097557 A1 | 4/2011 | May | |
| 2011/0109874 A1 | 5/2011 | Piers et al. | |
| 2011/0135850 A1 | 6/2011 | Saha et al. | |
| 2011/0188120 A1 | 8/2011 | Tabirian et al. | |
| 2011/0234944 A1 | 9/2011 | Powers | |
| 2011/0262844 A1 | 10/2011 | Tabirian | |
| 2012/0075168 A1 | 3/2012 | Osterhout et al. | |
| 2012/0140167 A1 | 6/2012 | Blum | |
| 2012/0162433 A1 | 6/2012 | Fuentes Gonzalez | |
| 2012/0188467 A1 | 7/2012 | Escuti | |
| 2013/0057814 A1 | 3/2013 | Prushinskiy et al. | |
| 2013/0202246 A1 | 8/2013 | Meade | |
| 2014/0055740 A1 | 2/2014 | Spaulding | |
| 2014/0211145 A1 | 7/2014 | Tabirian | |
| 2014/0252666 A1 | 9/2014 | Tabirian | |
| 2015/0049487 A1 | 2/2015 | Connor | |
| 2015/0081016 A1 | 3/2015 | De Sio et al. | |
| 2015/0276997 A1 | 10/2015 | Tabirian et al. | |
| 2016/0011564 A1 | 1/2016 | Tanabe et al. | |
| 2016/0023993 A1 | 1/2016 | Tabirian | |
| 2016/0047955 A1 | 2/2016 | Tabirian et al. | |
| 2016/0047956 A1 | 2/2016 | Tabirian et al. | |
| 2016/0209560 A1 | 7/2016 | Tabirian et al. | |
| 2016/0231592 A9 | 8/2016 | Beaton et al. | |
| 2016/0363484 A1 | 12/2016 | Barak et al. | |
| 2016/0363783 A1 | 12/2016 | Blum | |
| 2017/0010397 A1 | 1/2017 | Tabirian et al. | |

FOREIGN PATENT DOCUMENTS

| | | |
|---|---|---|
| GB | 2209751 | 5/1989 |
| JP | 2001142033 | 5/2001 |
| JP | 2004226752 | 8/2004 |

(56) References Cited

FOREIGN PATENT DOCUMENTS

| WO | 2007122573 | 11/2007 |
|---|---|---|
| WO | 2008130555 | 10/2008 |
| WO | 2008130559 | 10/2008 |

OTHER PUBLICATIONS

Tabiryan, et al., The Promise of Diffractive Waveplates, OPN Optics and Photonics News, Mar. 2010, 6 pages.
Tabiryan, et al., Fabricating Vector Vortex Waveplates for Coronagraphy; Aerospace Conference, 2012, EEE; publicly available Apr. 19, 2012, 12 pages.
Tabirian, et al., PCT Application No. PCT/US15/26186 filed Apr. 16, 2015, Notification of Transmittal of the International Search Report and the Written Opinion of the International Searching Authority dated Jul. 14, 2015, 17 pages.
Nersisyan, et al, Study of azo dye surface command photoalignment material for photonics applications, Applied Optics, vol. 49, No. 10, Apr. 1, 2010, 8 pages.
Nersisyan, et al., Characterization of optically imprinted polarization gratings, Applied Optics, vol. 48, No. 21, Jul. 20, 2009, 6 pages.
Nersisyan, et al., Fabrication of Liquid Crystal Polymer Axial Waveplates for UV-IR Wavelengths, Optics Express, vol. 17, No. 14, Jul. 2009, 9 pages.
Tabirian, N., U.S. Appl. No. 15/189,551, filed Jun. 22, 2016, Office Action Summary dated Feb. 27, 2018, 16 pages.
Nersisyan, et al., Polarization insensitive imaging through polarization gratings, Optics Express, vol. 17, No. 3, Feb. 2, 2009, 14 pages.
Sarkissian, et al., Longitudinally modulated nematic bandgap structure, Optical Society of America, vol. 23, No. 8, Aug. 2008, 6 pages.
Sarkissian, et al., Polarization-universal bandgap in periodically twisted nematics, Optics Letters, vol. 31, No. 11, Jun. 1, 2006, abstract, 4 pages.
Sarkissian, et al., Periodically Aligned Liquid Crystal: Potential Application for Projection Displays, Mol. Cryst. Liq. Cryst., vol. 451, 2006, 19 pages.
Sarkissian, et al., Potential application of Periodically Aligned Liquid Crystal cell for projection displays, JThE12, 2005, 3 pages.
Sarkissian, et al., Polarization-Controlled Switching between Diffraction Orders in Transverse-Periodically Aligned Nematic Liquid Crystals, Optics Letters, Aug. 2006, abstract, 4 pages.
Schadt, et al., Photo-Induced Alignment and Patterning of Hybrid Liquid Crystalline Polymer Films on Single Substrates, Jpn. J. Appl. Phys., vol. 34, Part 2, No. 6B, Jun. 15, 1995, 4 pages.
Schadt, et al., Photo-Generation of Linearly Polymerized Liquid Crystal Aligning Layers Comprising Novel, Integrated Optically Patterned Retarders and Color Filters, Jpn. J. Appl. Phys., vol. 34, Part 1, No. 6A, Jun. 1995, 10 pages.
Schadt, et al., Optical patterning of multi-domain liquid-crystal displays with wide viewing angles, Nature, vol. 381, May 16, 1996, 4 pages.
Escuti, et al., A Polarization-Independent Liquid Crystal Saptial-Light-Modulator, Liquid Crystals X, Proc. of SPIE, vol. 6332, 2006, 9 pages.
Escuti, et al., Polarization-Independent LC Microdisplays Using Liquid Crystal Polarization Gratings: A Viable Solution (?), Dept of Electrical & Computer Engineering @ ILCC, Jul. 1, 2008, 30 pages.
Escuti, et al., Simplified Spectropolarimetry Using Reactive Mesogen Polarization Gratings, Imaging Spectrometry XI, Proc. of SPIE, vol. 6302, 2006, 11 pages.
Gibbons, et al., Surface-mediated alignment of nematic liquid crystals with polarized laser light, Nature, vol. 351, May 2, 1991, 1 page.
Gibbons, et al., Optically Controlled Alignment of Liquid Crystals: Devices and Applications, Molecular Crystals and Liquid Crystals, vol. 251, 1994, 19 pages.
Gibbons, et al., Optically generated liquid crystal gratings, Appl. Phys. Lett., 65, Nov. 14, 1994, 3 pages.
University of Central Florida, School of Optics CREOL PPCE, Optics in the Southeast, Technical Conference and Tabletop Exhibit, Nov. 12-13, 2003, 9 pages.
Ichimura, et al., Surface assisted photoalignment control of lyotropic liquid crystals, Part 1, Characterization and photoalignment of aqueous solutions of a water soluble dyes as lyotropic liquid crystals, J. Materials. Chem., vol. 12, 2002, abstract, 2 pages.
Ichimura, et al., Reversible Change in Alignment Mode of Nematic Liquid Crystals Regulated Photochemically by "Command Surfaces" Modified with an Azobenzene Monolayer, American Chemical Society, Langmuir, vol. 4, No. 5, 1988, 3 pages.
Zel'Dovich, et al., Devices for displaying visual information, Disclosure, School of Optics/CREOL, University of Central Florida, Jul. 2000, 10 pages.
Provenzano, et al., Highly efficient liquid crystal based diffraction grating induced by polarization holograms at the aligning surfaces, Applied Physics Letter 89, 2006, 4 pages.
Titus, et al., Efficient polarization-independent, re ective liquid crystal phase grating, Applied Physics Letter 71, Oct. 20, 1197, 3 pages.
Chen, et al. An Electrooptically Controlled Liquid-Crystal Diffraction Grating, Applied Physics Letter 67, Oct. 30, 1995, 4 pages.
Kim, et al., Unusual Characteristics of Diffraction Gratings in a Liquid Crystal Cell, Advanced Materials, vol. 14, No. 13-14, Jul. 4, 2002, 7 pages.
Pan, et al., Surface Topography and Alignment Effects in UV-Modified Polyimide Films with Micron Size Patterns, Chinese Journal of Physics, vol. 41, No. 2, Apr. 2003, 8 pages.
Fuh, et al., Dynamic studies of holographic gratings in dye-doped liquid-crystal films, Optics Letter, vol. 26, No. 22, Nov. 15, 2001, 3 pages.
Yu, et al., Polarization Grating of Photoaligned Liquid Crystals with Oppositely Twisted Domain Structures, Molecular Crystals Liquid Crystals, vol. 433, 2005, 7 pages.
Crawford, et al., Liquid-crystal diffraction gratings using polarization holography alignment techniques, Journal of Applied Physics 98, 2005, 10 pages.
Seiberle, et al., 38.1 Invited Paper: Photo-Aligned Anisotropic Optical Thin Films, SID 03 Digest, 2003, 4 pages.
Wen, et al., Nematic liquid-crystal polarization gratings by modification of surface alignment, Applied Optics, vol. 41, No. 7, Mar. 1, 2002, 5 pages.
Anagnostis, et al., Replication produces holographic optics in volume, Laser Focus World, vol. 36, Issue 3, Mar. 1, 2000, 6 pages.
Gale, Replicated Diffractive Optics and Micro-Optics, Optics and Photonics News, Aug. 2003, 6 pages.
McEldowney, et al., Creating vortex retarders using photoaligned LC polymers, Optics Letter, vol. 33, No. 2, Jan. 15, 2008, 3 pages.
Stalder, et al., Lineraly polarized light with axial symmetry generated by liquid-crystal polarization converters, Optics Letters vol. 21, No., 1996, 3 pages.
Kakichashvili, et al., Method for phase polarization recording of holograms, Sov. J. Quantum. Electron, vol. 4, No. 6, Dec. 1974, 5 pages.
Todorov, et al., High-Sensitivity Material With Reversible Photo-Induced Anisotropy, Optics Communications, vol. 47, No. 2, Aug. 15, 1983, 4 pages.
Attia, et al., Anisoptropic Gratings Recorded From Two Circularly Polarized Coherent Waves, Optics Communications, vol. 47, No. 2, Aug. 15, 1983, 6 pages.
Cipparrone, et al., Permanent polarization gratings in photosensitive langmuir blodget films, Applied Physics Letter, vol. 77, No. 14, Oct. 2, 2000, 4 pages.
Nikolova, et al., Diffraction Efficiency and Selectivity of Polarization Holographic Recording, Optica Acta: International Journal of Optics, vol. 31, No. 5, 1984, 11 pages.
Lee et al., "Generation of pretilt angles of liquid crystals on cinnamte-based photoalignment . . . ", Opt., Expr., vol. 17 (26) (Dec. 2009), abstract, 4 pages.
Yaroshchuk et al. "Azodyes as photoalignment agents for polymerizable liquid crystals", IDW'06 Digest vol. 1-3, 2006, 4 pages.
Chigrinov et al. "Anchoring properties of photoaligned azo-dye materials" Phys. Rev., E vol. 68, (Dec. 2003), 5 pages.

(56) References Cited

OTHER PUBLICATIONS

Pagliusi et al. Surface-induced photorefractivity in twistable nematics: toward the all-optical control of gain, Opt. Expr. vol. 16, Oct. 2008, 9 pages.

M. Honma, T. Nose, Polarization-independent liquid crystal grating fabricated by microrubbing process,Jpn. J. Appl. Phys., Part 1, vol. 42, 2003, 3 pages.

Beam Engineering for Advaced Measurements Co., et al., PCT Application No. PCT/US2016/038666 filed Jun. 22, 2016, Notification of Transmittal of the International Search Report and the Written Opinion of the International Searching Authority, or the Declaration dated Oct. 10, 2016, 16 pages.

Marrucci, et al., Pancharatnam-Berry phase optical elements for wave front shaping in the visible domain, Appl. Phys. Lett. 88, 2006, 3 pages.

Sobolewska et al., "On the inscription of period and half period surface relief gratings in azobenzene-functionalized polymers", J. Phys. Chem., vol. 112 (15) Jan. 3, 2008, 10 pages.

Barrett et al., Model of laser driven mass transport in thin films of dye-functionalized polymers, J. Chem. Phys., vol. 109 (4), Jul. 22, 1998, 13 pages.

Tabirian, U.S. Appl. No. 14/214,375, filed Mar. 14, 2014, Office Action Summary dated Jun. 27, 2017, 10 pages.

Tabirian, et al., U.S. Appl. No. 14/688,425, filed Apr. 16, 2015, Office Action Summary dated Oct. 5, 2017, 10 pages.

Serak, et al. Diffractive Waveplate Arrays [Invited], Journal of the Optical Society of America B, May 2017, pp. B56-B63, vol. 34, No. 5, 8 pages.

Emoto, Optical and Physical Applications of Photocontrollable Materials: Azobenzene-Containing and Liquid Crystalline Polymers, Polymers,Jan. 2012, 150-186, vol. 4, 38 pages.

Pepper, M. et al, Nonlinear Optical Phase Conjugation, IEEE, Sep. 1991, pp. 21-34, 14 pages.

Tabirian, N., U.S. Appl. No. 14/194,808, filed Mar. 2, 2014, Office Action Summary dated Feb. 9, 2018, 10 pages.

Tabiryan, et al., Broadband waveplate lenses, Optics Express 7091, vol. 24, No. 7, Mar. 24, 2016, 12 pages.

Tabirian, N., U.S. Appl. No. 14/324,126, filed Jul. 4, 2014, Office Action Summary dated Feb. 8, 2018, 13 pages.

Tabiryan, et al. Superlens in the skies: liquid-crystal-polymer technology for telescopes, Newsroom, 2016, 2 pages.

Nersisyan, et al., The principles of laser beam control with polarization gratings introduced as diffractive waveplates, Proc. of SPIE, vol. 7775, 2010, 10 pages.

Heller, A Giant Leap for Space Telescopes, Foldable Optics, S&TR, Mar. 2003, 7 pages.

Beam Engineering for Advanced Measurements Co., PCT Application No. PCT/US2015026186, The Extended European Search Report, filed on Mar. 8, 2017, 13 pages.

Blinov, et al., Electrooptic Effects in Liquid Crystal MAterials, Springer-Verlag New York, 1994, 17 pages.

Crawford, et al., Liquid Crystals in Complex Geometries; Formed by Polymer and Porous Networks, Taylor and Francis, 1996, 4 pages.

Honma, et al., Liquid-Crystal Fresnel Zone Plate Fabricated by Microorubbing, Japanese Journal of Applied Phsyics, vol. 44, No. 1A, 2005, 4 pages.

Tabirian, N., et al., U.S. Appl. No. 61/757,259, filed Jan. 28, 2013, 29 pages.

Anderson, G., et al., Broadband Antihole Photon Sieve Telescope, Applied Optics, vol. 16, No. 18., Jun. 2007, 3 pages.

Early, J. et al., Twenty Meter Space Telescope Based on Diffractive Fresnel Lens, SPIE, U.S. Department of Energy, Lawrence Livermore National Laboratory, Jun. 2003, 11 pages.

Martinez-Cuenca, et al., Reconfigurable Shack-Hartmann Sensor Without Moving Elements,Optical Society of America, vol. 35, No. 9, May 2010, 3 pages.

Serak, S., et al., High-efficiency 1.5 mm Thick Optical Axis Grating and its Use for Laser Beam Combining, Optical Society of America, vol. 32, no., Jan. 2007, 4 pages.

Ono et al., Effects of phase shift between two photoalignment substances on diffration properties in liquid crystalline grating cells, Appl. Opt. vol. 48, Jan. 2009, 7 pgs.

Naydenova et al., "Diffraction form polarization holographic gratings with surface relief in side chain azobenzene polyesters" J. Opt. Soc. Am. B, vol. 15, (1998), 14 pages.

Oh et al., Achromatic polarization gratings as highly efficent thin-film polarizing beamsplitters for broadband light Proc. SPIE vol. 6682, (2007), 4 pages.

Nersisyan, S., et al., Polarization insensitive imaging through polarization gratins, Optics Express, vol. 17, No. 3, Feb. 2 ,2009, 14 pages.

Oise, Optics in the Southeast, Technical Conference and Tabletop Exhibit, Optical Society of America, Orlando, FL., Nov. 12-13, 2003, 9 pages.

Dierking, Polymer Network-Stabilized Liquid Crystals, Advanced Materials, vol. 12, No. 3, 2000, 15 pages.

Nersisyan, S., et al., "Optical Axis Gratings in Liquid Crystals and Their Use for Polarization Insensitive Optical Switching," 2009, Journal of Nonlinear Optical Physics & Materials, vol. 18, pp. 1-47.

De Sio, L., et al., "Digital Polarization Holography Advancing Geometrical Phase Optics," 2016, Optics Express, vol. 24, Issue 16, pp. 18297-18306.

Tabiryan, N., et al., "Thin Waveplate Lenses of Switchable Focal Length—New Generation in Optics," 2015, Optics Express, vol. 23, Issue 20, pp. 25783-25794.

Borek, G. and D. Brown, "High-performance diffractive optics for beam shaping," 1999, Proceeding of SPIE, vol. 3633, pp. 51-60.

Gerchberg, R. and W Saxton, "A practical algorithm for the determination of the phase from image and diffraction plane pictures," 1972, Optik, vol. 35, Issue 2, pp. 237-246.

ELECTRO-OPTICAL DIFFRACTIVE WAVEPLATE BEAM SHAPING SYSTEM

FIELD OF THE INVENTION

This invention relates generally to the field of optics, and in particular to optical and electro-optical beam shaping systems and methods based on diffractive waveplates.

BACKGROUND OF THE INVENTION

One of the ways to control the spatial distribution of an optical beam, such as a laser beam or a beam of light from one or more light emitting diodes (LEDs), is to use a diffractive diffuser. Unlike conventional optical components such as refractive lenses and prisms, which control the spatial distribution of light primarily by means of refraction of light at the surfaces of dielectric media, diffractive diffusers control the spatial distribution of light by means of diffraction.

While there are many applications in which diffractive diffusers have been found to be useful, limitations of the existing technology prevent the expansion of the uses of diffractive diffusers into additional areas of application. Among these limitations are (1) the lack of the ability to electronically switch the characteristics of diffractive diffusers, (2) an upper limit on the angular range through which light can be diffracted using available types of diffusers, and (3) excessive fabrication time and cost.

The limitation of currently available diffractive diffusers on the capability to allow electronic switching of optical properties is inherent in the material structure of these diffractive diffusers. Currently, diffractive diffusers are static dielectric structures that are only minimally affected by the application of an electric field. Therefore, the optical properties of diffractive diffusers based on prior art cannot be electronically switched to any meaningful extent.

The limitation of currently available diffractive diffusers on the angular range through which light can be diffracted is due to the inability to achieve sufficiently fine feature sizes. The range of diffraction angles of which a diffractive diffuser is capable is inversely proportional to the minimum feature size of said diffractive diffuser. More specifically, the maximum angle in radians through which a diffractive diffuser is capable of diffracting a light beam is approximately the wavelength of the light divided by the minimum feature size.

An additional limitation of the existing technology is that the processes for fabricating a custom diffractive diffuser are time-consuming and expensive. Typically, the processes required to produce a diffractive diffuser include multi-step photolithography and various types of etching, such as reactive ion etching or acid etching.

The technology of diffractive waveplates, including electronically switchable diffractive waveplates, has been applied to several areas of optics, allowing, for example, lenses whose focal lengths are electrically switchable, and beam deflectors that can be switched on and off. However, diffractive waveplate technology has not been applied to design and fabrication of diffractive diffusers, and in particular, it has not been applied to fabrication of electronically switchable diffractive diffusers, i.e. diffusers whose diffractive properties can be electronically switched on and off.

Thus, there is a need for beam shaping systems with electronically switchable characteristics, with feature sizes smaller than are readily attainable with existing technology, and for which the associated fabrication technology does not involve time-consuming or expensive processes.

SUMMARY OF THE INVENTION

A primary object of the present invention to provide an optical beam shaping system comprising an illumination source and one or more diffractive diffusers based on diffractive waveplate technology. Such diffusers will be referred to herein as diffractive waveplate diffusers.

A secondary object of the present invention is to provide an electro-optical beam shaping system comprising an illumination source and one or more diffractive waveplate diffusers whose optical properties can be electronically switched.

A third object of the present invention is to provide a method for fabricating a diffractive waveplate diffuser. The method to be provided allows diffractive waveplate diffusers to be fabricated such that they provide any desired illumination pattern, limited only by the quality of the input beam collimation and the lower limit on feature size imposed by available fabrication methods.

In one embodiment of the invention, a system comprising at least one illumination source and a diffractive waveplate diffuser is disclosed. The illumination source may be an optical source such as at least one laser, or at least one light emitting diode, used in conjunction with suitable collimating optics. The diffractive waveplate diffuser consists of a patterned layer of optically anisotropic material with a retardance of one-half of the intended operational wavelength. The meaning of "patterned" in this context is that the spatial dependence of the angle describing the optical axis orientation has been set to a pattern that has been determined to produce the desired spatial distribution of optical power density in a target plane. In some embodiments, the patterned layer of optically anisotropic material is static and cannot be switched by electronic means. In other embodiments, the patterned layer of optically anisotropic material can be switched between a diffracting state and a state producing negligible diffraction.

In another embodiment of the invention, a method is provided for determining the pattern of optical axis orientation angle that will produce the desired spatial distribution of optical power. In some embodiments, the target plane is at a specific finite distance from the diffractive waveplate diffuser, the desired spatial distribution of optical power is described by a spatially-dependent optical power density in the target plane, and the desired distribution of optical power density is described as a function of coordinates along two orthogonal Cartesian coordinate axes in the target plane. In other embodiments, the target plane is in the far field of the diffractive waveplate diffuser, and the desired spatial distribution of optical power is described by a radiant intensity distribution that is a function of two orthogonal angular coordinates.

Further objects and advantages of this invention will be apparent from the following detailed description of the presently preferred embodiments which are illustrated schematically in the accompanying drawings.

BRIEF DESCRIPTION OF THE DRAWINGS

FIG. 3A and FIG. 3B illustrate an optical beam shaping system system of the present invention.

FIG. 6 shows an example of the performance of the design procedure described by FIG. 4, for the circular distribution of FIG. 5.

FIG. 7 illustrates results from the implementation of the design method of FIG. 4, when the desired output beam profile consists of the symbols "beamco.com.

DESCRIPTION OF THE PREFERRED EMBODIMENTS

Before explaining the disclosed embodiments of the present invention in detail it is to be understood that the invention is not limited in its applications to the details of the particular arrangements shown since the invention is capable of other embodiments. Also, the terminology used herein is for the purpose of description and not of limitation.

In the Summary of the Invention above and in the accompanying drawings, reference is made to particular features (including method steps) of the invention. It is to be understood that the disclosure of the invention in this specification does not include all possible combinations of such particular features. For example, where a particular feature is disclosed in the context of a particular aspect or embodiment of the invention, that feature can also be used, to the extent possible, in combination with and/or in the context of other particular aspects and embodiments of the invention, and in the invention generally.

In this section, some embodiments of the invention will be described more fully with reference to the accompanying drawings, in which preferred embodiments of the invention are shown. This invention can, however, be embodied in many different forms and should not be construed as limited to the embodiments set forth herein. Rather, these embodiments are provided so that this disclosure will be thorough and complete, and will convey the scope of the invention to those skilled in the art. Like numbers refer to like elements throughout, and prime notation is used to indicate similar elements in alternative embodiments.

The present invention relates to the design and fabrication of optical and electro-optical beam shaping systems based on diffractive waveplates. Methods of design and fabrication are provided that allow the creation of such beam shaping systems that produce a wide variety of spatial distributions of optical power. The design and fabrication methods disclosed herein apply both to diffusers that produce specific optical power distributions in planes at a finite distance from the diffusers, and to diffusers that produce specific optical power distributions in the far field of the diffusers.

A list of components from the figures will now be provided.

101 Input beam of light from an illumination source such as a laser or LED.

102 Layer of optically anisotropic material with orientation of the optical axis independent of position.

103 Beam of light after it has passed through a layer of optically anisotropic material.

104 Angular coordinate describing a beam of light after it has passed through a layer of optically anisotropic material and propagated to the far field of the layer.

201 Input beam of light from an illumination source such as a laser or LED.

202 Layer of optically anisotropic material with orientation angle of the optical axis linearly dependent on one Cartesian coordinate; this type of structure may be referred to as a cycloidal diffractive waveplate.

203 Beam of light after it has passed through a cycloidal diffractive waveplate, showing that the direction of propagation of the light beam has changed due to diffraction by the cycloidal diffractive waveplate.

Figure 2:
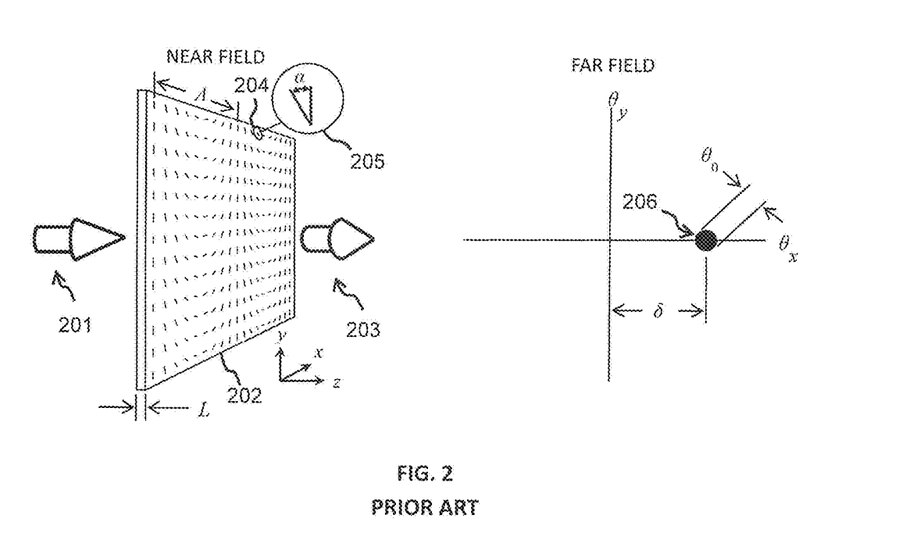
FIG. 2 illustrates a diffractive waveplate with modulation of the optical axis orientation that is linear in a single Cartesian coordinate in the plane of the layer, based on prior art. This type of diffractive waveplate can also be described as a cycloidal diffractive waveplate.

204 A line segment illustrating the local orientation of the optical axis of the layer of optically anisotropic material comprising the cycloidal diffractive waveplate 202.

205 Expanded view illustrating the orientation with respect to a reference direction of the optical axis of the layer of optically anisotropic material at a particular transverse location in the layer.

206 Illustration of the far-field radiant intensity after the beam has been diffracted by the cycloidal diffractive waveplate 202.

301*a* Incident collimated beam of light.

302*a* Diffractive waveplate diffuser designed to produce a specified spatial distribution of radiant intensity in the far field of said diffuser.

303*a* Light beam after passing through the diffractive waveplate diffuser 302*a*.

Figure 3A:
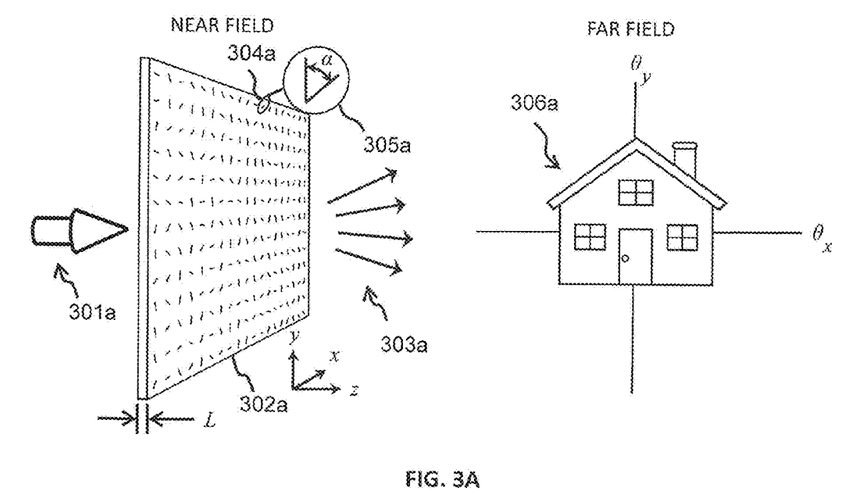
FIG. 3A illustrates a diffractive waveplate diffuser that produces a desired spatial distribution of optical radiance in the far field of the diffractive waveplate diffuser.

304*a* A line segment illustrating the local orientation of the optical axis of the layer of optically anisotropic material comprising the diffractive waveplate diffuser 302*a*.

305*a* Expanded view illustrating the orientation with respect to a reference direction of the optical axis of the layer of optically anisotropic material comprising the diffractive waveplate diffuser 302a at a particular transverse location in the layer.

306a Illustration of the far-field spatial distribution of radiant intensity, as a function of two orthogonal angular coordinates, after the beam has been diffracted by the diffractive waveplate diffuser 302a.

301b Incident collimated beam of light.

302b Diffractive waveplate diffuser designed to produce a specified spatial distribution of light at a finite range.

303b Light beam after passing through the diffractive waveplate diffuser 302b.

Figure 3B:
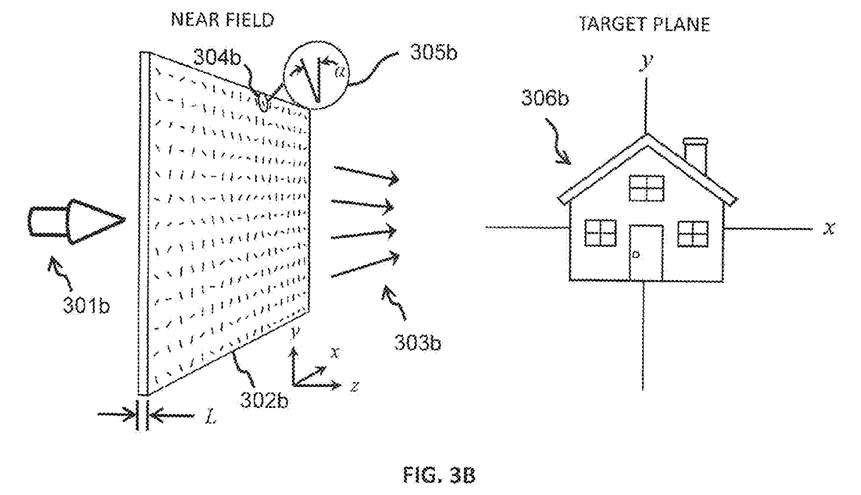
FIG. 3B illustrates a diffractive waveplate diffuser that produces a desired spatial distribution of optical power density at a plane located at a specific finite distance from the diffractivze waveplate diffuser.

304b A line segment illustrating the local orientation of the optical axis of the layer of anisotropic material comprising the diffractive waveplate diffuser 302b.

305b Expanded view illustrating the orientation with respect to a reference direction of the optical axis of the layer of optically anisotropic material comprising the diffractive waveplate diffuser 302b at a particular transverse location in the layer.

306b Illustration of the spatial distribution of optical power at a finite distance from the diffractive waveplate diffuser 302b, as a function of two orthogonal Cartesian coordinates, after the beam has been diffracted by the diffractive waveplate diffuser 302b.

400 Flow chart for method of fabrication of a diffractive waveplate diffuser.

401 The step in method 400 in which the desired output beam profile is defined and selected.

402 The step in method 400 in which the output beam profile of step 401 is converted into a digital model representing the optical amplitude at each point of the desired output beam profile.

403 The step in method 400 in which a separate and independent random optical phase is paired with an amplitude at each position in the digital model created in stop 402.

404 The step in method 400 in which the amplitude at each point in the model created in step 402 is combined with the random phase of step 403, resulting in an amplitude and phase at each point of the digital model of the output beam profile.

405 The step in method 400 in which the inverse discrete Fourier transform (DFT) is obtained of the combined amplitude and phase of step 404.

406 The step in method 400 in which the inverse DFT of step 405 produces an estimate of the input amplitude and phase required to produce the desired output beam profile.

407 The step in method 400 in which a mask is applied to the input amplitude of step 406, in order to account for the shape of the input beam that is expected to be used with the diffractive waveplate diffuser that will be produced by the design that is the output of algorithm 400.

408 The step in method 400 in which a DFT is applied to the input amplitude and phase from step 407.

409 The step in method 400 in which in which the DFT of step 408 predicts the output amplitude and phase in the far field of the diffractive waveplate diffuser.

410 The step in method 400 in which a decision is made regarding whether or not to perform another iteration of steps 405 through 409.

411 The step in method 400 in which an additional optical phase is added to the phase resulting from the previous steps, in order to cause the desired output beam profile to occur at a finite distance from the diffractive waveplate diffuser.

412 The step in method 400 in which the orientation pattern of the optical axis within the layer of optically anisotropic material is assigned based on the optical phase computed in steps 401 through 411.

413 The step in method 400 in which the optical axis orientation pattern is applied to the layer of optically anisotropic material.

501 An example of the amplitude portion of an output beam profile, in this case a uniform circular distribution of optical radiant intensity within the circle, and zero radiant intensity outside the circle.

502 A small area of the example of the amplitude portion of an output beam profile, showing that the radiant intensity is uniform within the solid angle of a circular cone defining the beam profile, and zero outside the cone.

Figure 4:
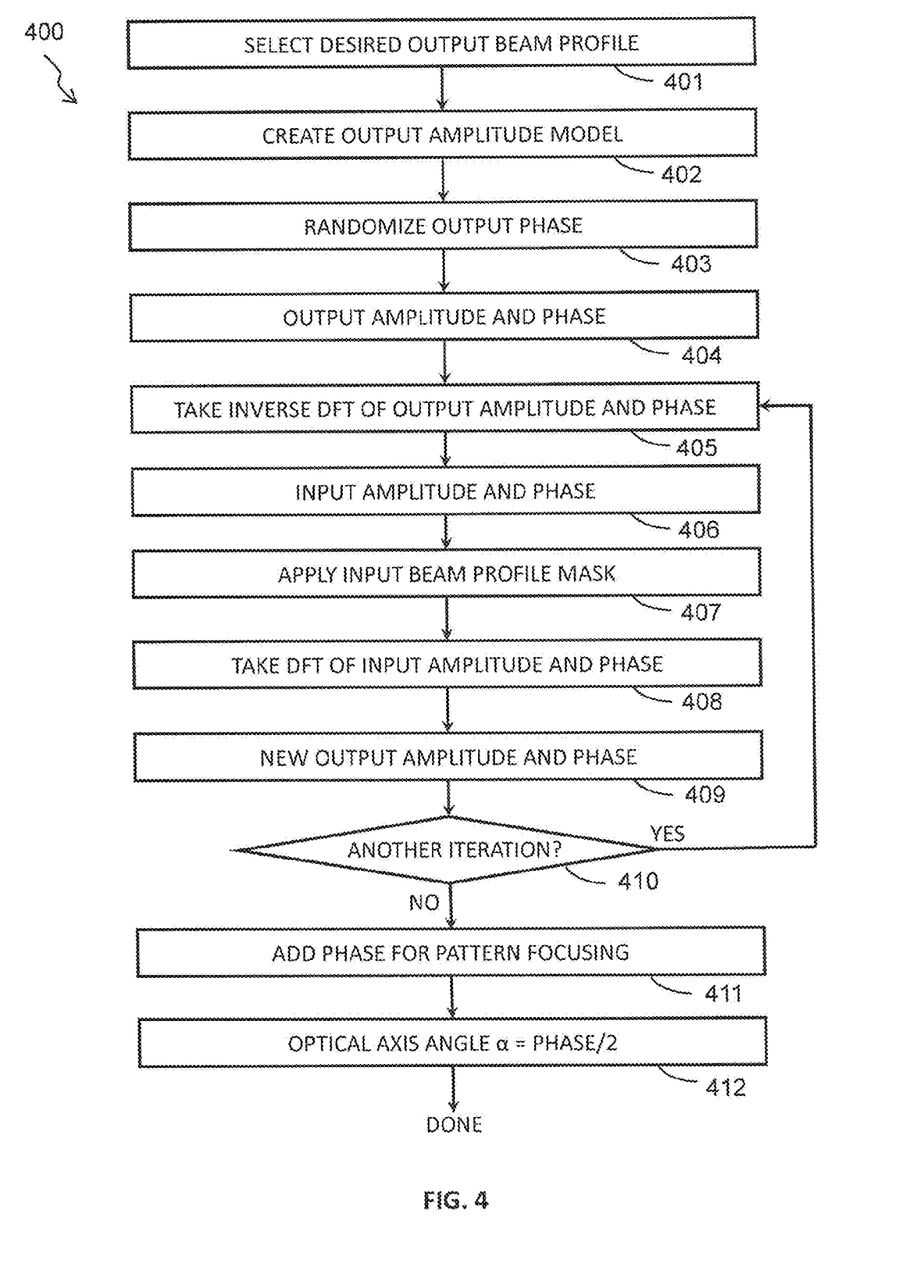
FIG. 4 provides a step-by-step description for a method for fabricating a diffractive waveplate diffuser of the present invention. The method includes a procedure to determine the optical axis orientation pattern needed in a diffractive waveplate diffuser that will produce a desired spatial distribution of optical power.

503 A small area of the output beam profile predicted to be produced by a diffractive diffuser designed in accordance with the procedure illustrated in FIG. 4.

800 Switchable liquid crystal diffractive waveplate diffuser

Figure 1:
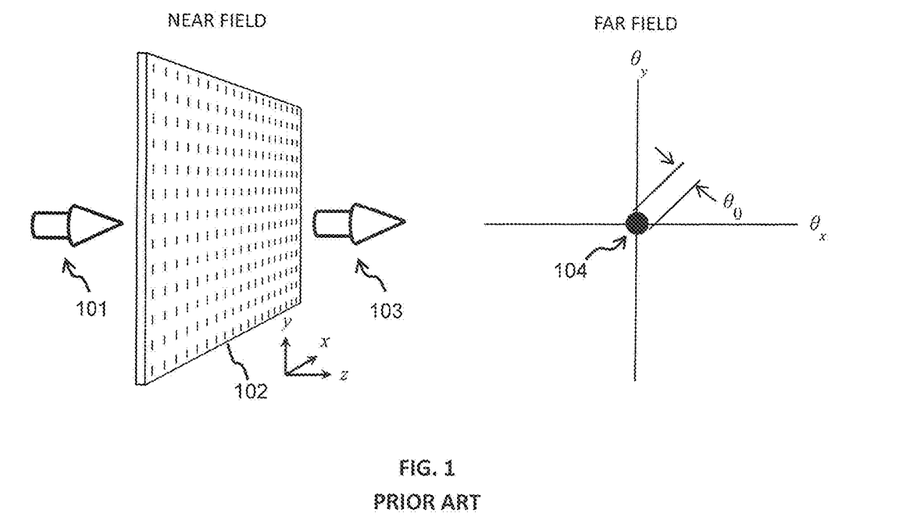
FIG. 1 illustrates a waveplate with no spatial modulation of the orientation of the optical axis, based on prior art.

805 Beam of light incident on switchable liquid crystal diffractive waveplate diffuser 810 Transparent optical substrate 820 Transparent electrode 830 Alignment layer 840 Liquid crystal 850 Alignment layer 860 Transparent electrode 870 Transparent optical substrate 875 Beam of light diffracted by switchable liquid crystal diffractive waveplate diffuser 880 Electronics control system 890 Electrical conductor 900 Input beam 910 First switchable liquid crystal diffractive waveplate diffuser 920 Second switchable liquid crystal diffractive waveplate diffuser 930 Third switchable liquid crystal diffractive waveplate diffuser 940 Output beam 950 Electronic control system 960 Electrical conductor FIG. 1 illustrates prior art in the propagation of an optical beam through a layer of optically anisotropic material, for the case in which the optical axis orientation is uniform throughout the area occupied by the optical beam. In FIG. 1, an input collimated optical beam 101 is incident on such an anisotropic layer 102, and the result of propagation through the layer is to possibly change the polarization of the optical beam, but without causing any change in the direction of propagation of the beam. In FIG. 1, the local orientation of the optical axis is illustrated by short line segments in waveplate 102. In FIG. 1, the output beam 103 propagates in the same direction as the input beam 101. Defining an angular coordinate system $(\theta_x, \theta_y)$ such that the input beam, if propagated to infinity, would be centered at $(\theta_x, \theta_y)=(0,0)$, the result of propagating the beam through the layer 102 of optically anisotropic material is that output beam 103 is also located at this same location 104. If the input collimated beam 101 has a diameter d and a wavelength $\lambda$, the lower limit on the far-field angular diameter of the diffracted beam will be $\theta_0 = d/\lambda$ due to diffraction.

FIG. 2 illustrates prior art in the propagation of an optical beam through a layer of optically anisotropic material, for the case in which the optical axis orientation is modulated linearly along one Cartesian coordinate. In FIG. 2, the local orientation of the optical axis is illustrated by short line segments. In FIG. 2, an input collimated optical beam 201 is incident on a layer 202 of optically anisotropic material, and the result of propagation through the layer is a change in the direction of propagation of the beam. For simplicity of explanation, it will be assumed that the input beam 201 in FIG. 2 is circularly polarized. It is assumed that the thickness L of the layer 202 of optically anisotropic material satisfies the half-wave condition $L\Delta n=\lambda/2$, where $\lambda$ is the wavelength of the light and $\Delta n$ is the anisotropy of the refractive index of the dielectric material comprising the layer 202. The type of grating in which the optical axis orientation angle $\alpha(x, y)$ varies linearly with one Cartesian coordinate in the plane transverse to the surface of the layer, as in FIG. 2, is called a cycloidal diffractive waveplate. For the case shown in FIG. 2, $\alpha(x, y)=\pi x/\Lambda$. Here $\Lambda$ is the period of the cycloidal diffractive waveplate, defined as the distance over which the optical axis orientation angle $\alpha$ changes by pi radians, as illustrated in FIG. 2. For this case, the output beam 203 propagates in a direction that is offset by an angle $\delta=\arc\sin(\lambda/\Lambda)$ relative to the direction of propagation of the input beam 201. The optical axis orientation at one particular location is indicated at 204, and in an expanded form at 205. The far-field beam profile, centered at an angle offset by $\delta$ from the angle to which beam 201 would have propagated if it had not encountered the cycloidal diffractive waveplate 202, is shown at 206.

The explanation of diffraction by a cycloidal diffractive waveplate, as illustrated in FIG. 2, applies if the input beam is circularly polarized. As is well known in the art, the only change that would result if the handedness of the circular polarization of the input beam were changed would be that the sign of the beam deflection angle $\delta$ would change. If the input beam were collimated and had components of both left and right circular polarization, then all of the light would be diffracted but the component of left-hand circular polarization would be diffracted through an angle that is equal in magnitude, but opposite in sign, to the angle through which right-hand circularly polarized light is diffracted.

The prior art of FIG. 1 and FIG. 2 provides a basis for describing a preferred embodiment of an optical beam shaping system of the present invention illustrated in FIG. 3. As in FIG. 1 and FIG. 2, the input beam 301a in FIG. 3A is collimated and, for simplicity, will be assumed to be circularly polarized. The illumination source that produces the input beam 301a may include a laser, one or more LEDs, and collimating optics. As was the case for the cycloidal diffractive waveplate whose operation is illustrated in FIG. 2, the thickness L of the layer 302a of optically anisotropic material satisfies the half-wave condition $L\Delta n=\lambda/2$, where $\lambda$ is the wavelength of the light and $\Delta n$ is the anisotropy of the dielectric material comprising the layer 302a. The pattern of optical axis orientation in layer 302a is designed in accordance with the methods disclosed herein to create a diffracted output 303a that has an arbitrary spatial pattern in the far field of the diffractive waveplate diffuser. As shown at 304a, and in an expanded view 305a, the optical axis orientation angle at any point described by Cartesian coordinates (x, y) in the plane of the diffractive waveplate diffuser is given by $\alpha(x, y)$. In order to emphasize that the far field pattern can be selected arbitrarily, a schematic image 306a of a house is used as an example of a far field spatial pattern of the radiance from the illuminated diffractive diffuser.

The embodiment of the present invention illustrated in FIG. 3A produces an arbitrarily selected distribution of radiant intensity in the far field of the diffractive waveplate diffuser. By adding an optical phase with a quadratic dependence on distance from a point in the plane of the diffuser, the pattern can be focused at a finite distance from the diffractive waveplate diffuser. This alternative configuration is illustrated in FIG. 3B. The input beam 301b in FIG. 3B is collimated and, for simplicity, will be assumed to be circularly polarized. The illumination source that produces the input beam 301b may include a laser, one or more LEDs, and collimating optics. As was the case for the cycloidal diffractive waveplate whose operation is illustrated in FIG. 2, and for the diffractive waveplate diffuser of FIG. 3A, the thickness L of the layer 302b of optically anisotropic material satisfies the half-wave condition $L\Delta n=\lambda/2$, where $\lambda$ is the wavelength of the light and $\Delta n$ is the anisotropy of the dielectric material comprising the layer 302b. The pattern of optical axis orientation in layer 302b is designed in accordance with the methods disclosed herein to create a diffracted output 303b that has an arbitrary spatial pattern in a target plane located at a specific distance from the diffractive waveplate diffuser. As shown at 304b, and in an expanded view 305b, the optical axis orientation angle at any point described by Cartesian coordinates (x, y) in the plane of the diffractive waveplate diffuser is given by $\alpha(x, y)$. In order to emphasize that the far field pattern can be selected arbitrarily, a schematic image 306b of a house is used as an example of a pattern of the optical power density produced in the target plane by the illuminated diffractive diffuser.

A method illustrated in FIG. 4 of fabricating a diffractive waveplate diffuser includes a procedure for determining the appropriate optical axis orientation angle pattern $\alpha(x, y)$. The procedure will be explained using the example of results illustrated in FIG. 5.

The first step 401 is to select a desired output beam profile, which can either be expressed as a function of angle in the far field of the diffractive waveplate diffuser, or as a function of transverse position in a target plane parallel the plane of the diffractive waveplate diffuser. For purposes of illustration, the desired output beam profile will be defined as follows:

$$I_0(\theta_x, \theta_y) = 1 \text{ for } (\theta_x^2 + \theta_y^2)^{1/2} \leq 10° \atop I_0(\theta_x, \theta_y) = 0 \text{ for } (\theta_x^2 + \theta_y^2)^{1/2} > 10°} \quad (I)$$

From Eqn. (I), the desired output beam profile is uniform radiant intensity within an angular cone with a diameter of 20 degrees, and zero radiant intensity outside this cone of angles. Although in the example described by Eqn. (I) the desired output beam profile is a simple cone, the method described herein is compatible with a desired output beam profile represented by any grayscale image. The example using a fixed cone of angles is illustrated at 501 in FIG. 5. An expanded view of a small portion of the illuminated cone of angles is shown at 502 in FIG. 5.

The next step of the procedure is step 402 in which an amplitude model is created from the desired output beam profile. In this step, a digital representation of the desired output beam profile is created. For the exemplary case illustrated in FIG. 5, the output beam profile is represented by an array of 2048×2048 digital numbers, with each point representing the desired radiant intensity at a specific value of angular coordinates $(\theta_x, \theta_y)$.

The next steps of the procedure of FIG. 4 are steps 403 and 404 in which each amplitude determined in step 402 is paired with a value of optical phase selected at random. In most applications, the optical phase in the output beam is not important, and it is well known in the art that the assumption of a random phase pattern in the output plane allows the identification of a phase pattern in the input plane that produces the desired output beam amplitude profile.

The next steps of the procedure of FIG. 4 are steps 405 and 406 in which an inverse discrete Fourier transform (DFT) of the output phase and amplitude is performed, thereby generating an initial estimate of the input amplitude and phase.

The next step of the procedure is step 407 in which the amplitude of the input beam is replaced with the known profile of the collimated input beam that will illuminate the diffractive waveplate diffuser.

The next steps of the procedure of FIG. 4 are steps 408 and 409 in which a DFT of the input phase and amplitude is performed, thereby predicting the output amplitude and phase for the diffractive waveplate design.

As is well known in the art, iterative techniques such as the Gerchberg-Saxton algorithm may improve the accuracy with which the output beam profile represented by the output amplitude and phase at step 409 of FIG. 4 represents the desired output beam profile. The performance of an additional iterative step can be conditioned, for example, on whether or not the output amplitude from step 409 agrees sufficiently well by some quantitative criterion with the desired output beam profile, or on whether or not a preset number of iterations has been performed.

Once the selected condition is met that precludes another iteration of steps 405 through 409 of FIG. 4, step 411 may be performed. The need to perform step 411 depends on the distance D from the diffractive waveplate diffuser at which the output beam profile is defined. If $D \ll d^2/\lambda$, where d is the diameter of the optical beam that will illuminate the diffractive waveplate diffuser, and $\lambda$ is the wavelength of that beam, then diffraction-limited focusing of the output beam profile requires the performance of step 411. If $D \gg d^2/\lambda$, then diffraction-limited focusing of the diffuser pattern does not require the performance of step 411.

Step 412 of FIG. 4 is the stage within the overall procedure at which the optical phase determined from steps 401 through 411 is converted to an optical axis orientation in the diffractive waveplate diffuser. With prior art methods, the imposition of position-dependent optical phase on the beam requires spatially-varying physical thickness of a dielectric material, created by such means as etching of a dielectric substrate with acid or with an ion beam. The physical thickness of a dielectric medium obviously cannot be electronically switched. With the disclosed method, on the other hand, by which a spatially-dependent optical phase is imposed by means of a spatially-varying optical axis orientation angle $\alpha(x, y)$, some dielectrics, such as certain liquid crystal materials, can have their optical axis orientation switched by means of application of an electric field, thereby switching on or off the diffractive characteristics of the diffractive waveplate diffuser.

Figure 5:
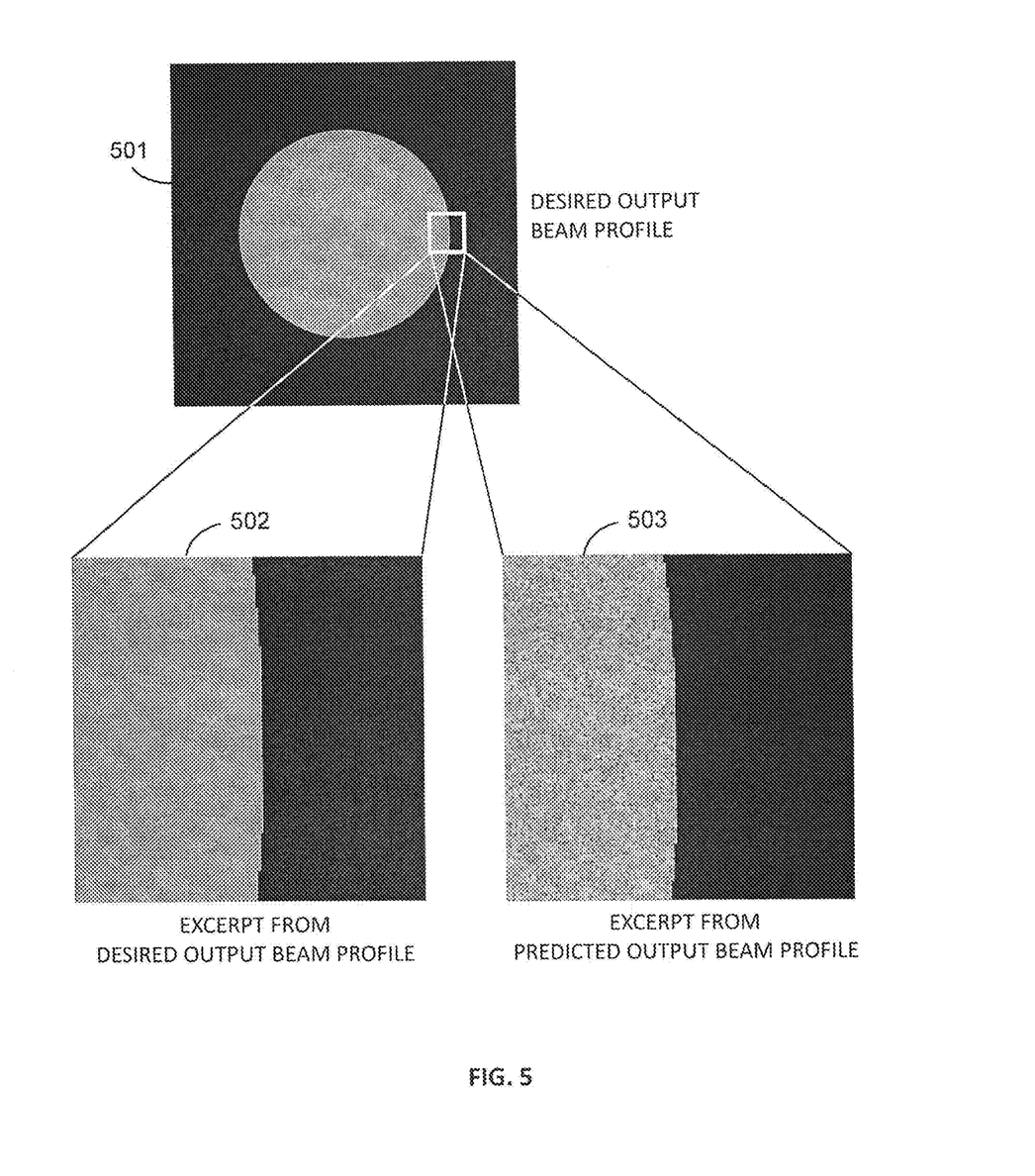
FIG. 5 illustrates the result of implementing the design procedure illustrated in FIG. 4 for the case in which the desired distribution of optical power is a uniform circular distribution of light.

The result of implementing all of the steps of FIG. 4, with 300 iterations of steps 405 through 409, is illustrated at 503 in FIG. 5 for the exemplary case of a diffractive waveplate diffuser that is designed to produce the uniformly-illuminated cone of light described by Eqn. (I). Comparing the desired output beam profile 502 with the predicted output beam profile 503 for the design produced with the method of FIG. 4, it is evident that the predicted output beam profile 503 is the same as the desired output beam profile 502, except that the predicted output has some spatial fluctuations in amplitude. These fluctuations would be of no consequence in many applications.

Figure 6A:
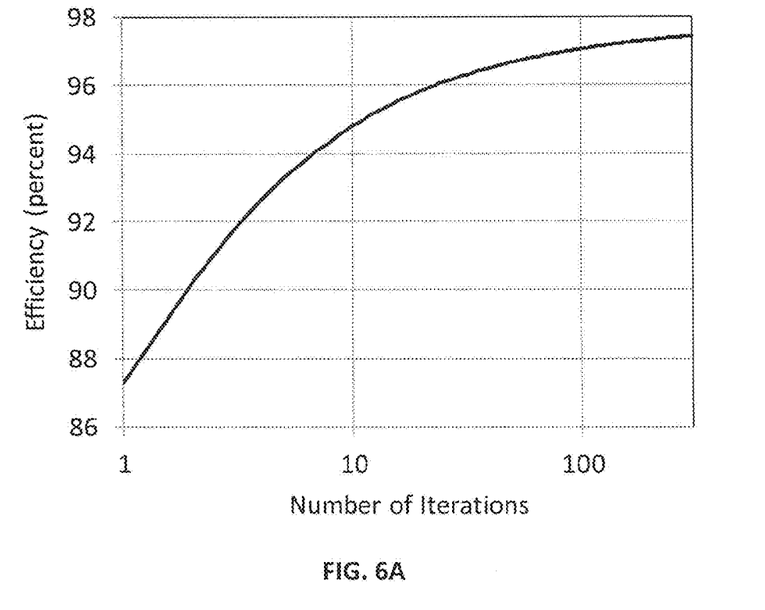
FIG. 6A shows the dependence of the efficiency with which a diffractive waveplate diffuser designed as illustrated in FIG. 4 diffracts optical power into the desired circular pattern illustrated in FIG. 5, as a function of the number of iterations performed within the procedure described by FIG. 4.
Figure 6B:
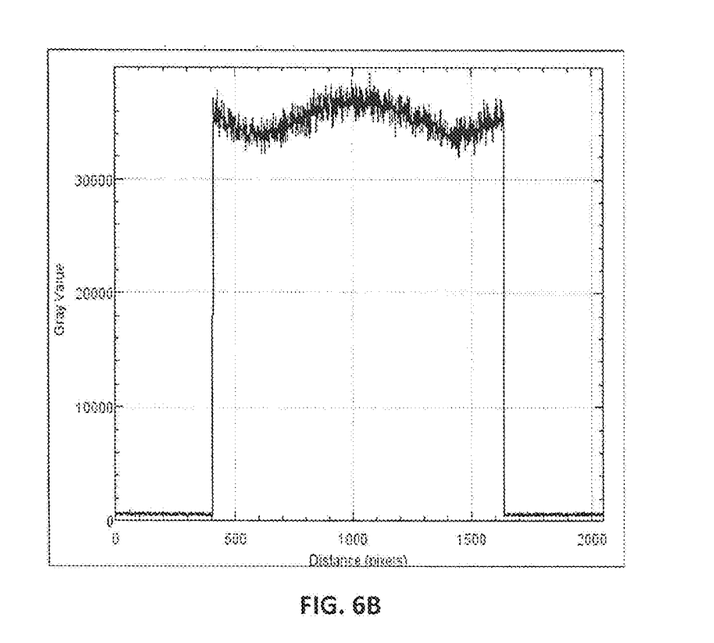
FIG. 6B shows the profile of the optical power density that is predicted to be produced by a diffractive diffuser designed based on the procedure illustrated in FIG. 4 when the desired profile is as illustrated in FIG. 5.

Two ways of quantitatively measuring the success of the method of diffractive waveplate design illustrated in FIG. 4 are shown in FIG. 6. FIG. 6A shows the predicted percentage of optical power within the desired illuminated area of a beam propagated through a diffractive waveplate designed to produce the 20 degree cone of illumination shown in FIG. 5. According to FIG. 6A, after a single execution of steps 405 through 409 of FIG. 4, 87 percent of the light transmitted through the diffractive waveplate diffuser is within the 20 degree cone of illumination, and after 300 executions of steps 405 through 409, 97 percent of the light is within that cone. FIG. 6B is a horizontal beam profile across the predicted output beam profile produced by the design method of FIG. 4, for the beam profile of FIG. 5, again after 300 iterations of steps 405 through 409 of FIG. 4. In FIG. 6B, horizontal pixel 400 on the horizontal axis represents one edge of the 20 degree cone angle, and pixel 1630 represents the other edge of this cone. As is evident from FIG. 6B, other than a slight modulation of the radiance across the 20 degree cone, the design method produces an accurate representation of the desired uniform radiant intensity distribution.

Figure 7A:
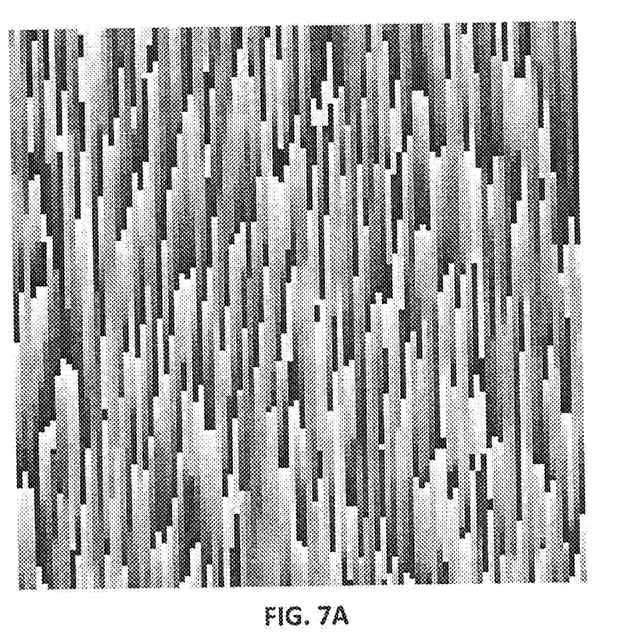
" FIG. 7A is an excerpt from the optical axis orientation map produced by the design method of FIG. 4 for this case.
Figure 7B:
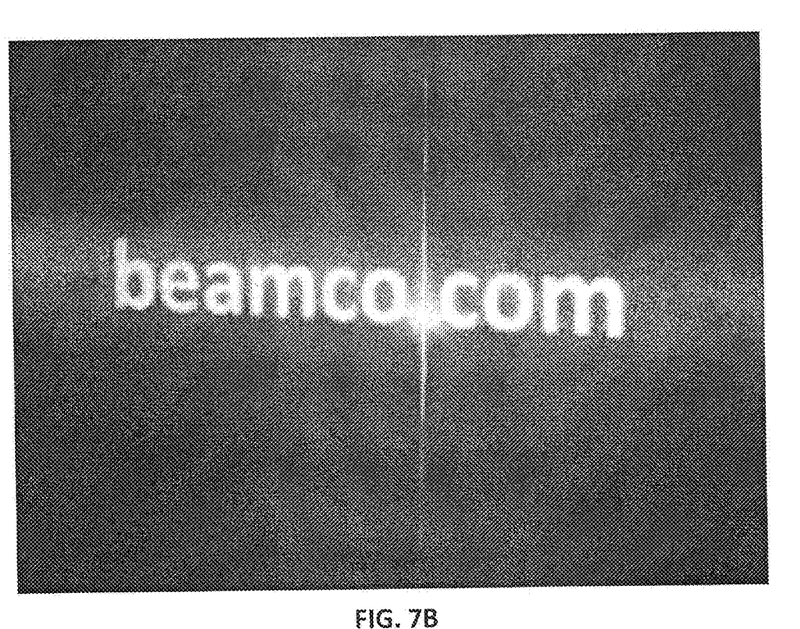
FIG. 7B is a photograph of an output beam profile produced by a laser-illuminated diffractive waveplate diffuser of the present invention.

FIG. 7 illustrates another application of the design method of FIG. 4, this time for a desired output beam profile consisting of the letters "beamco.com." FIG. 7A shows the phase angle $\alpha(x, y)$ produced by the design method of FIG. 4 for this beam profile. In FIG. 7A, for clarity and legibility, only a 100 pixel by 100 pixel region of the 2048×2048 pixel digital representation of the optical axis orientation map $\alpha(x, y)$ is shown. In FIG. 7A, $\alpha(x, y)=0+n\pi$ is represented by black, and $\alpha(x, y)=\pi+n\pi$ is represented by white for all integers n. FIG. 7B is a photograph of the beam profile produced when a collimated laser beam with a wavelength of 532 nanometers was propagated through a diffractive waveplate diffuser, with optical axis orientation angle as described in the optical axis orientation map $\alpha(x, y)$ of which FIG. 7A represents a small part. The diffractive waveplate diffuser that produced the beam profile shown in FIG. 7B was fabricated in liquid crystal polymer in accordance with the invention disclosed herein.

Figure 8:
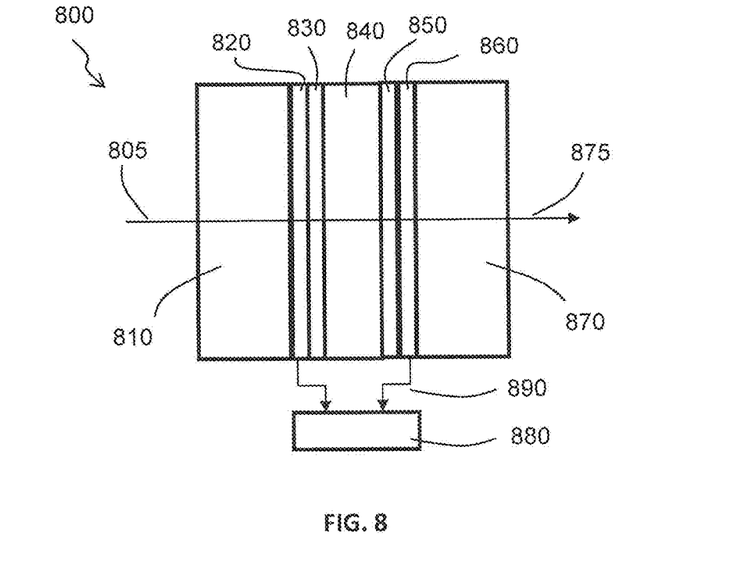
FIG. 8 illustrates the configuration of a switchable diffractive waveplate diffuser, including an electronic control system that controls the electric potential between two transparent conductive coatings.

FIG. 8 illustrates the configuration of a switchable liquid crystal diffractive waveplate diffuser of the present invention. A cross section 800 shows both the layers of said diffuser and the associated electronic controls. A beam of light 805, constituting an illumination source, is incident on the diffuser. The layers comprising the switchable liquid crystal diffractive waveplate diffuser are a first transparent optical substrate 810, a first transparent conductive coating 820, a first alignment layer 830, a liquid crystal layer 840, a second alignment layer 850, a second transparent conductive coating 860, and a second transparent optical substrate 870. A diffracted beam of light 875 emerges from said diffuser. An electronic control system 880 connected through electric conductors 890 to the transparent conductive coatings 820 and 860 may be used to apply an electric field across the liquid crystal layer 840. The alignment layer may consist of a photoalignment material such as PAAD-72 available from Beam Engineering for Advanced Measurements Co. The alignment layer may be photoaligned by methods known from prior art. The thickness of the liquid crystal layer 840 is designed to provide one-half wave of retardation at the intended operating wavelength of the switchable diffractive waveplate diffuser when the electric field across said liquid crystal layer is off. For a typical value of liquid crystal anisotropy of $\Delta n=0.1$, the thickness of the liquid crystal layer would be 2.7 micrometers for an intended operating wavelength of 532 nm. Switching of the diffractive waveplate diffuser is accomplished by switching the electric field across the liquid crystal 840 on and off. When the electric potential across the liquid crystal layer 840 has sufficient magnitude, typically a few volts, the retardation of the switchable diffractive waveplate diffuser approaches zero, so the light beam is not significantly diffracted by said diffuser. When the electric field is zero, the retardation across the liquid crystal layer is one-half wave by design, resulting in diffraction of the light beam transmitted through said diffuser.

Figure 9:
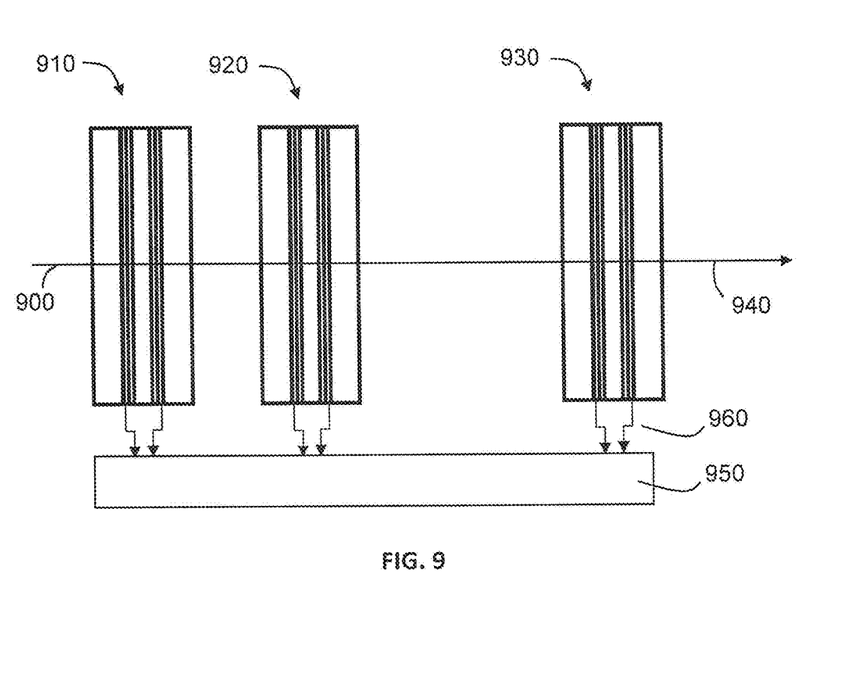
FIG. 9 illustrates the propagation of a beam of light produced by an illumination source through a plurality of switchable diffractive waveplate diffusers.

FIG. 9 illustrates a configuration in which multiple switchable diffractive waveplate diffusers are used in series, that is, in a configuration in which the incident light passes successively through more than one such diffuser. Although the case in which three switchable diffractive waveplate diffusers is used as an example in FIG. 9, whatever number of such diffusers needed for a given application could be used. An beam of light 900, constituting an illumination source, is incident on a first switchable diffractive waveplate diffuser 910, then successively passes through a second such diffuser 920 and a third such diffuser 930. Each of the switchable diffractive waveplate diffusers is configured as in the description provided above for the configuration of switchable diffractive waveplate diffuser 800 in FIG. 8. After passing through all three diffusers in FIG. 9, the light beam exits the set of three diffusers at 940. Each diffuser is controlled by electronic control system 950 which is connected through electrical conductors 960 to the transparent conductive coatings of diffusers 910, 920, and 930.

Configurations such as shown in FIG. 9, with a plurality of switchable diffractive waveplate diffusers, allow great flexibility in the output beam pattern. As an example, if an electric field is applied to all but one of the diffusers by the electronic control system 950, then only the one without any electric field across its liquid crystal layer will diffract the light. More generally, if a number m of switchable diffractive waveplate diffusers are configured in series, as illustrated in FIG. 9 for m=3, then only the diffraction pattern of the kth such diffuser will be imposed on the transmitted beam if an electric field is applied to all m of the diffusers except the kth such diffuser.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. An optical beam shaping system comprising:
   (a) at least one illumination source; and
   (b) at least one diffractive waveplate diffuser, each diffuser comprising a layer of optically anisotropic material wherein the orientation of anisotropy axis is spatially patterned in a predetermined manner; and wherein optical retardance introduced by said layer of optically anisotropic material is one-half wave at an operating wavelength; and wherein the phase of said illumination source propagated through the film is shaped to produce a selected diffraction pattern in a target plane when illuminated with said illumination source; and wherein shaping of an optical phase is obtained by a local angle of anisotropy axis in a predetermined orientation pattern of the layer of said optically anisotropic material with respect to a reference direction.

2. The system according to claim 1, wherein the optically anisotropic material with patterned orientation of anisotropy axis comprises:
   at least one layer of a liquid crystal polymer.

3. The system according to claim 1, wherein the illumination source comprises:
   (a) at least one laser, and
   (b) collimating optics.

4. The system according to claim 1, wherein the illumination source comprises:
   (a) at least one light emitting diode; and
   (b) collimating optics.

5. The system according to claim 1, wherein at least one of the diffractive waveplate diffusers further comprises:
   (a) transparent conductive coatings on two boundaries of the patterned layer of optically anisotropic material;
   (b) an electronic control system for applying an electric field across the patterned layer of optically anisotropic material;
   (c) the patterned layer of optically anisotropic material with the optical retardance is switched between one-half wave and zero at an operating wavelength when said electric field is applied.

6. The system according to claim 5, wherein the patterned layer of optically an isotropic material consists of a liquid crystal, bounded on each side by an alignment layer.

7. The system according to claim 5 comprising at least two diffractive waveplate diffusers with different beam shaping properties.

* * * * *